June 11, 1940.    O. HENZE    2,204,082

FISHING REEL

Filed Oct. 18, 1938

Inventor
OTTO HENZE
By Leon Edelson
Attorney

Patented June 11, 1940

2,204,082

UNITED STATES PATENT OFFICE 2,204,082

FISHING REEL

Otto Henze, Philadelphia, Pa.

Application October 18, 1938, Serial No. 235,654

2 Claims. (Cl. 242—84.5)

This invention relates generally to improvements in fishing reels, more particularly that type known in the art as star drag reels, wherein mechanism is provided for disconnecting the reel shaft from the operating crank shaft in order that the spool itself may revolve freely with no friction or drag to overcome than that produced by its own bearings. A reel of this type is shown and described in my prior Patent No. 1,940,593, granted December 19, 1933, it being among the objects of the present invention to provide reels of the patented type with an improvement for rendering the same more convenient to operate under certain circumstances.

As is well known to users of the star-drag free-spool type of reel, it is frequently desirable, after the line has been cast, to play out some additional line. In order to effect this it is necessary to throw the star drag reel into free-spool condition so that the spool is free to rotate relatively to the operating handle, thereby permitting the line to be manually withdrawn from the spool to the desired extent, it being understood that in order to so withdraw the line from the spool the latter must be free to rotate in the same direction of rotation as when a cast is made with the reel in free-spool condition, this being accomplished as just indicated, by throwing the control lever into free-spool position.

In order to prevent unwinding of the line from the spool to an extent greater than desired, all star drag reels are conventionally equipped with pawl and ratchet elements which so coact as to prevent reverse rotation of the spool with respect to its operating handle. It is the object of the present invention to provide a means for rendering the pawl and ratchet elements inoperative so that the spool may be reversely wound at will by means of the operating handle of the reel even while the latter is "in gear". In other words, it is the object of this invention to convert at the will of the fisherman the star drag type of reel into a conventional free-spool type of reel and vice versa.

The importance of this feature resides in the fact that when the spool is released to play out additional line by throwing the reel into free spool, if it should be necessary suddenly to wind in the line upon the spool, the free spool lever must be thrown into operating position, else rotation of the handle will be free of the spool and the latter will not be rotated to wind in the line. In the excitement of a "catch", the fisherman may forget to shift the free spool lever into operating position and even though he holds the operating handle against rotation, the baited fish may nevertheless withdraw sufficient line from the spool to enable it to free itself from the hook and at the same time cause the line to snag about the freely running spool. By providing the means of the present invention, there is no necessity to place the reel in free-spool condition and so long as the fisherman retains control of the operating handle there is no possibility for the fish to "run away" with the line.

The foregoing and other objects and advantages of the invention will appear more fully hereinafter, it being understood that the invention consists substantially in the combination, construction, location and relative arrangement of parts, all as will appear more fully hereinafter, as shown in the accompanying drawing, and as finally pointed out in the appended claims.

Figure 1:
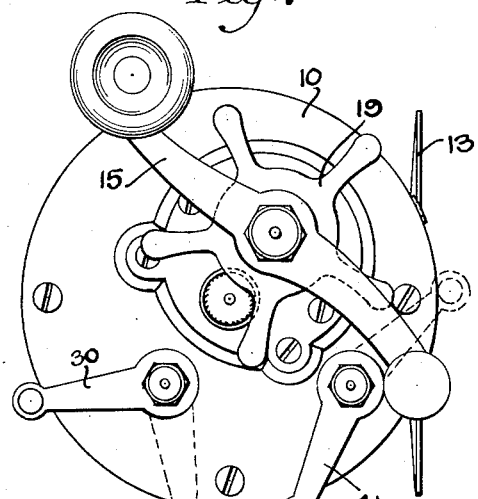
Figure 1 is an end elevational view of the reel constructed in accordance with and embodying the principles of the present invention.

Referring now more particularly to the drawing, it will be observed that, except as will presently appear, in all essential respects the reel as constructed in accordance with and embodying the principles of the present invention is the same as that shown and described in my prior Patent No. 1,940,593 of December 19, 1933 above referred to and to which reference is herein specifically made. Inasmuch as the essential constructional details of the reel are quite fully described in my said prior patent, only so much of the reel will be described herein as is believed necessary for a complete understanding of the present invention.

In general, the reel of the present invention comprises a pair of end plates 10 and 11 which are secured together in the assembled relation shown by a plurality of pillars 12 and by a cross-plate 13 to which latter the fishing rod (not shown) may be attached.

Accommodated within a suitable recess therefor in the inner surface of the end plate 10 is a main driving gear 14 the shaft of which projects exteriorly of the end plate 10 for securement to a suitable operating handle 15. Interposed between the handle 15 and the driving gear 14 is a friction drag unit 16 the adjustment of which may be effected by means of the star wheel 19, in the manner and for the purpose described in my prior patent.

Suitably journalled within opposed bearing elements 20 and 20ª respectively provided in the end plates 10 and 11 is the spindle 21 of the spool assembly 22 adapted for rotation between the end plates. Slidably mounted upon the bearing element 20 and in constantly meshed engagement with the main driving gear 14 is a second gear 24. This latter gear is so axially shiftable upon the bearing 20 that it may be brought into and out of engagement with the spool spindle 21 without, however, effecting its disentrainment with respect to the main driving gear 14. In order to effect the necessary positive driving engagement between the gear 24 and the spindle 21, the said gear is notched, as at 25, to non-rotatably accommodate a correspondingly shouldered element 26 on the spindle 21.

The mechanism for effecting axial movement of the driven gear 24 into and out of engagement with the spindle 21 is described in detail in my prior patent aforesaid and consists generally of a spring pressed yoke 27 operatively associated with the gear 24, an actuating cam plate 28 for the yoke, an eccentric disc 29 for shifting the cam plate and a lever 30 for rotating the eccentric disc in one direction or the other to shift the gear into or out of operative engagement with the spool spindle 21. It is believed sufficient for the present purposes to state that when the lever 30 is in the full-line positions shown in Figures 1, 2 and 4, the reel is in "free-spool" condition, that is, the gear 24 is disengaged from the spindle 21 so that the handle 15 may be rotated in line-winding direction without effecting a corresponding rotation of the spool 22. When, however, the free-spool lever 30 is thrown into the dotted line position of Figures 1, 2 and 4, the gear 24 is engaged with the spindle with the result that rotation of the handle 15 in line-winding direction imparts corresponding rotation to the spool. It will be noted that the lever 30, through the snap-action of the spring 31 upon the eccentric disc 29, is caused to assume one or the other of its extreme positions and never a position therebetween, in consequence of which the driven gear 24 is always either positively connected to the reel spindle 21 or positively disconnected therefrom.

Figure 2:
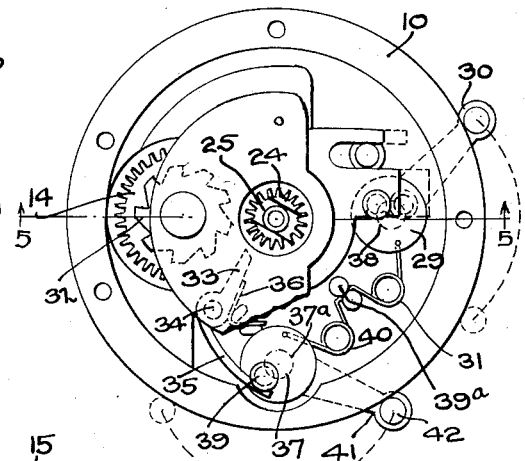
Figure 2 is a view showing the inner surface of the right hand end plate of the reel.
Figure 3:
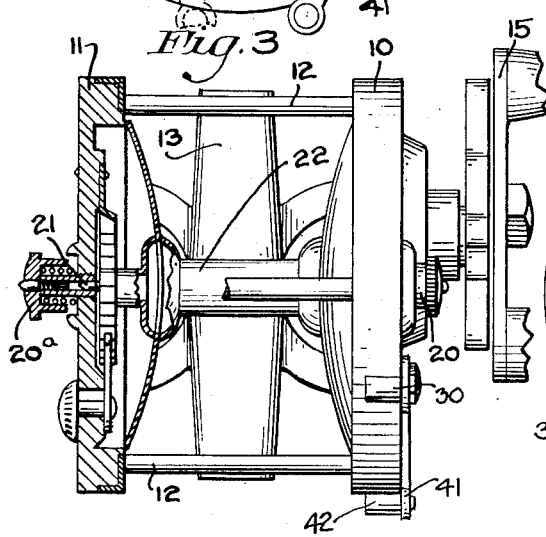
Figure 3 is a side elevational view of the reel, a portion thereof being shown in vertical cross-section.
Figure 4:
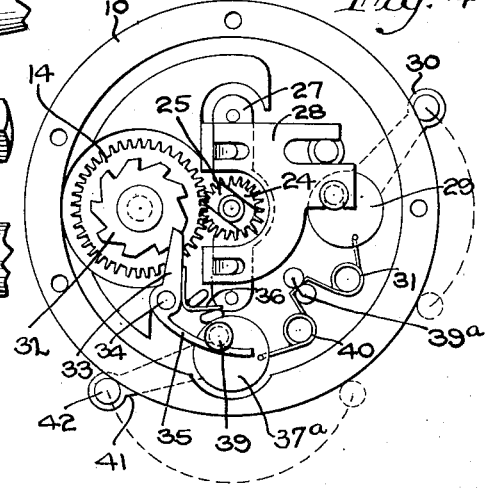
Figure 4 is a view corresponding to Figure 2 but with the gear cover plate removed.
Figure 5:
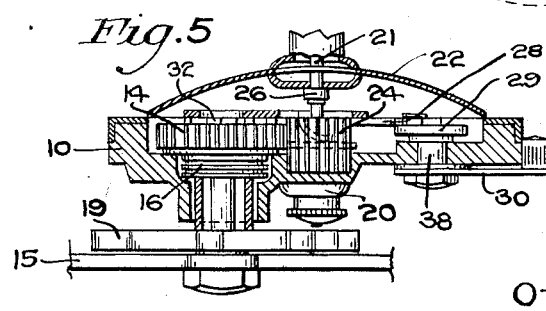
Figure 5 is a sectional view taken on the line 5—5 of Figure 2.

As appears most clearly in Figures 2 and 4, the main driving gear 14 is provided upon one face thereof with a ratchet 32 which is normally adapted to be non-rotatably associated with the driving gear through the intervention of the friction drag unit 16 aforesaid. Operatively associated with this ratchet 32 is a pawl element 33 which is pivoted, as at 34, upon the end plate 10 and is provided with an oppositely extending curved arm 35. A spring element 36 operatively engages the pawl element 33 and serves normally to yieldingly press the latter into operative engagement with the ratchet 32.

Projecting through the end plate 10 is a stub shaft 37 (similar in all respects to the stub shaft 38 of the free-spool lever 30) to the inner extremity of which is secured a circular disc 37ª provided with an eccentrically located headed pin 39 which is adapted to engage the curved arm 35 of the pawl element 33. A spring 40, quite similar in structure and function to the spring 31, is secured in intervening relation between the circular disc 37ª and the fixed abutment 39ª formed in the end plate 10, while secured to the outer extremity of the stub shaft 37 is an actuating lever 41. It will be observed that this latter lever 41 is structurally similar to the lever 30 in that it also is provided with a laterally extending knob 42, which extends across and is adapted to engage the peripheral edge of the end plate 10 in such manner that when said lever 41 is shifted in one direction or the other, the spring 40 acts to snap it into one or the other of its two possible extreme positions. It will be understood, of course, that the springs 31 and 40 may be constructed as a unit, as shown in Figures 2 and 4, with the intermediate portion thereof secured fixedly in position between the abutments 39ª provided therefor in the end plate 10.

When the lever 41 is in the normal position shown in Figure 4, the pawl element 33 is urged by its spring 36 into engagement with the ratchet 32 and so restrains it from rotating freely in but one direction, to wit, in line-winding direction, the reel thus functioning as a conventional star drag reel. However, when the lever 41 is thrown into its other extreme position, as shown in Figure 2, the eccentric disc 37ª is so rotated that the pin 39 thereof engages the curved arm 35 and shifts it outwardly to an extent sufficient to disengage the pawl element 33 from the ratchet 32. The reel then operates as a conventional free-spool reel, the spool being then free to be rotated by the handle 15 in either direction, the free spool lever 30 being in its "in-gear" position, that is, in such position that the spool is positively coupled to the operating handle. Consequently, in this last-mentioned position of the pawl-lever 41, as much line as may be desired may be withdrawn from the spool without the necessity of throwing the reel into free-spool condition and should a strike be made it is only necessary to operate the handle 15 to wind the line in upon the spool.

It will be understood, of course, that the present invention is not intended to be limited in its application to the particular construction of reel herein described but instead is applicable generally to all star-drag reels, and it is accordingly intended to claim the invention broadly, as well as specifically, as indicated in the appended claims.

1. In a fishing reel, in combination, a pair of end plates, a spool rotatable therebetween, a handle for effecting rotation of said spool, a friction drag mechanism, a ratchet and pawl mechanism and associated with said friction drag mechanism normally operative to permit rotation of said spool freely in one direction and against the friction of said drag mechanism in the other direction, a lever pivoted upon the external face of one of said end plates, means intervening said lever and pawl for disconnecting the latter from its ratchet upon operation of said lever whereby to permit free rotation of said spool in either direction, and spring means for throwing said lever in one or the other of two extreme positions to insure the pawl being either positively engaged with or positively disengaged from its associated ratchet.

2. In a fishing reel, in combination, a pair of end plates, a spool rotatable therebetween, a pinion rotatably mounted in one of said end plates for movement axially with respect to said spool, coacting means on said pinion and spool for effecting a driving connection therebetween, a main driving gear constantly entrained with said pinion for imparting rotation thereto, ratchet mechanism including a ratchet and a coacting spring-pressed pawl operatively associated with said driving gear to normally restrain the latter against rotation except in one direction, and a spring-pressed lever operatively associated with said pawl and adapted to be snapped into one or the other of two extreme positions to selectively engage or disengage said pawl from said ratchet whereby to render said ratchet mechanism operative or inoperative.

OTTO HENZE.